(No Model.)
C. C. TYLER.
METHOD OF MAKING MILLING CUTTERS.
No. 408,446.  Patented Aug. 6, 1889.
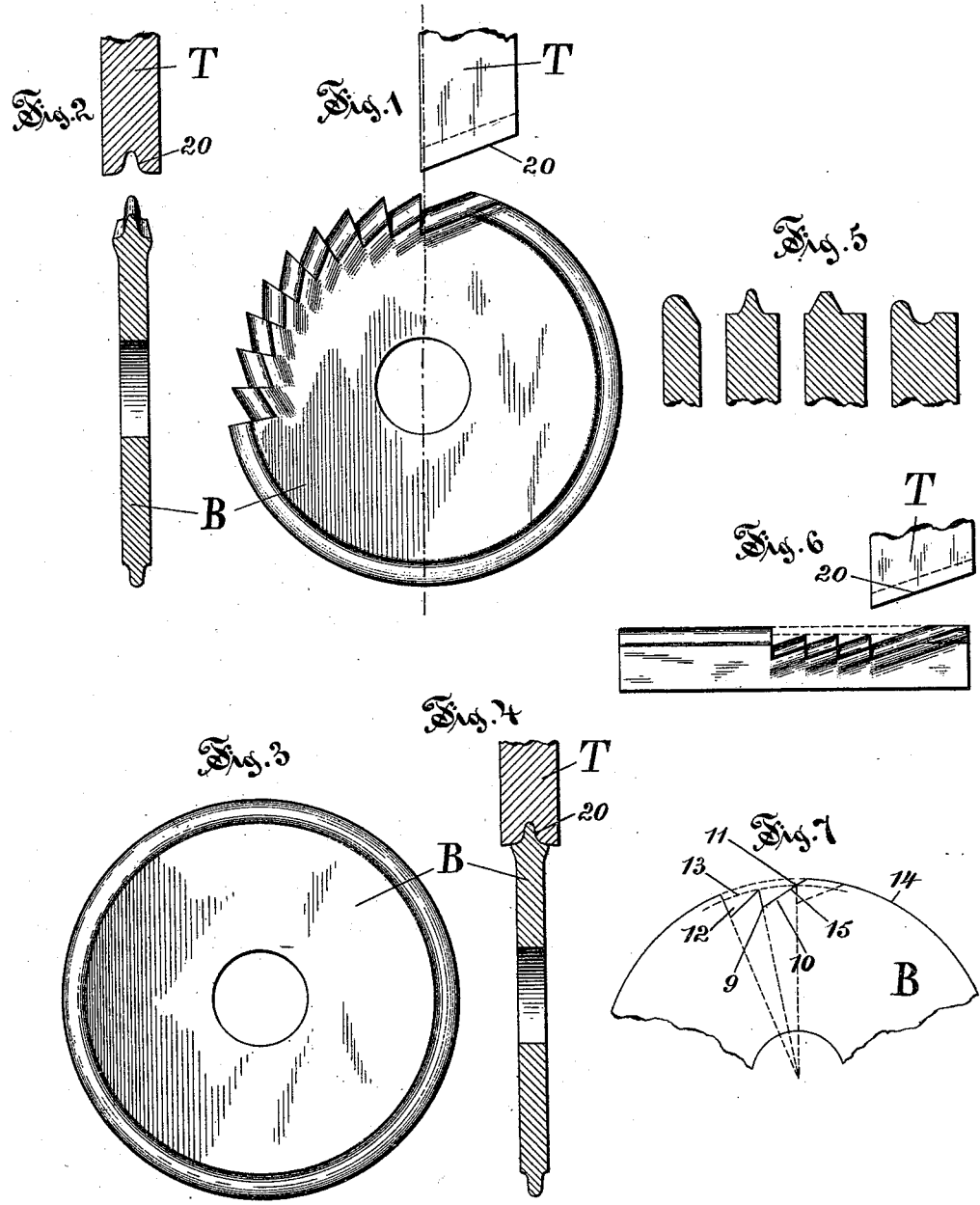

UNITED STATES PATENT OFFICE.

CHARLES C. TYLER, OF CHESHIRE, CONNECTICUT.

METHOD OF MAKING MILLING-CUTTERS.

SPECIFICATION forming part of Letters Patent No. 408,446, dated August 6, 1889.

Application filed November 17, 1888. Serial No. 291,137. (No model.)

*To all whom it may concern:*

Be it known that I, CHARLES C. TYLER, a citizen of the United States, residing at Cheshire, in the county of New Haven and State of Connecticut, have invented certain new and useful Improvements in Methods of Making Milling-Cutters, of which the following is a specification.

This invention relates to the manufacture of milling-cutters adapted to be used for the cutting of gears and pinions, the object being to furnish a method whereby such cutters having superior qualities may be produced with precision and economy.

In the drawings accompanying and forming a part of this specification, Figure 1 is a side elevation, drawn on an enlarged scale, of a partly-formed milling-cutter embodying my invention, and it illustrates in part the method of forming by compression the cutting-teeth on the cutter-blank. Fig. 2 is a cross-sectional view further illustrative of the improvement. Fig. 3 is a view of the cutter-blank ready for the cutting-teeth to be formed thereon. Fig. 4 is a view illustrating the displacement of the metal of the bank by the forming-tool. Fig. 5 shows several cross-sectional forms or outlines of cutters which may be produced by my improved method. Fig. 6 illustrates the application of my improvements to the making of straight cutters. Fig. 7 is a diagrammatic view illustrating the practicing of my invention.

Similar characters designate like parts in all the figures.

For the manufacture of milling-cutters by my newly-invented method or process cutter-blanks may be used of a diameter precisely corresponding to the required diameter of the finished cutters; but it is one of the objects of my improvement to furnish a method whereby to make cutters of a definite and predetermined size from inaccurately-prepared blanks of slightly-varying diameters. Accordingly I ordinarily make the said blank to be over size, and reduce the same to the required size simultaneously with and by the forming of the teeth on said blank. By this means, when making small cutters, (for which my improvement is more particularly adapted,) the blanks may be first cut out by means of cutting-dies from sheet metal of suitable quality, and afterward "cut" or "toothed" without any other intermediate preparation than forming therein the usual central hole for the cutter-carrying arbor. Consequently by my new process I am able to produce milling-cutters of a high quality and precision at a very low cost and very uniform in size and shape.

The instrumentality by means of which I ordinarily practice my invention consists of a tooth-forming compressor-tool T, having on its working-face 20 a conformation coinciding with the form of tooth to be made. This tool, when making circular cutters of a required size from an oversize blank, is always limited in its working stroke to stop at a certain precise distance from the center of the cutter.

The operation of forming a tooth consists in the compression of the blank, unheated and in its natural condition, by a suitable instrumentality or tool in a direction crosswise to the line of the points of the cutting-teeth and at such an angle thereto as is proper to form the required relief or "backing off" for the tooth—that is, by a movement of the said tool in a direction parallel to the face of the tooth formed by said movement. This having been done once, as at 12, Fig. 7, the blank is advanced (relative to such instrumentality) and another compression similarly effected. When an oversize blank B is used, the line 15 of the final compression extends from the root 9 of the tooth 10 upward and forward to the intersection 11 with the line 13 of the points of the cutting-teeth and beyond point 11 to the periphery 14 of the blank. The blank is now advanced through the arc (or space) from point 9 to point 11, Fig. 7, and the operation repeated. It will thus be seen that the true size of the cutter is a line extending through the points 11 of the cutting-teeth, and that the position of these points is determined by the angle of said line 15 and by the distance through which the blank is advanced between the successive compressions. It will also be seen that by my improved method the atoms of metal which finally constitute the cutting-point of a cutter-tooth are positioned in the cutter-blank by the compression of that portion of said blank prior to the forming of the face of said cutter-tooth, and that at no time are said atoms elevated relative to the line of the points of the teeth by the action of the tooth-forming tool.

While this improved method for producing milling-cutters is more especially designed for the making of cutters of relatively small size, yet by previously shaping the cutter-blanks to closely approximate their final form or contour larger sizes of cutters can readily be cut or toothed in the same manner. My improvements are also applicable not only to the making of circular cutters, but also to the making of straight cutters—such, for instance, as shown in Fig. 6.

Having thus described my invention, I claim—

1. The process herein described for making toothed cutters, which consists in displacing by compression the metal of the blank in a direction crosswise to the line of the points of the cutting-teeth and paralled to the cutting-face of the tooth formed to form the relief-space of another tooth, substantially as described.

2. The process herein described for making toothed cutters having a series of relieved cutting-teeth, which consists in displacing by successive compressions the metal of the blank in a direction crosswise to the line of the points of the cutting-teeth and parallel to the cutting-face of the tooth formed to form the relief-spaces of the teeth, each successive compression being made forward of the previously-formed tooth, substantially as described.

3. The process herein described for simultaneously sizing and toothing milling-cutters, which consists in reducing an over-size blank by successive compressions in a direction crosswise to and advancing along the line of the points of the cutting-teeth, the compressions being made each parallel to the cutting-face of a preceding tooth, substantially as described.

4. The process herein described for making toothed cutters having a series of relieved cutting-teeth, which consists in the reducing of an approximately-shaped and over-size blank to an accurately-sized cutter by successive tooth-forming compressions made, respectively, in directions that are in substantial alignment with the cutting-faces of the cutting-teeth, each compression being made in advance of the preceding one to simultaneously form the relief of one tooth and the cutting-face of the next preceding tooth, all substantially as described.

CHARLES C. TYLER.

Witnesses:
JAMES E. LAITY,
HENRY W. KEIGWIN.